United States Patent
Jarrett

[19]

[11] Patent Number: 6,085,559
[45] Date of Patent: Jul. 11, 2000

[54] ANTI-THEFT DEVICE INCLUDING LOCKBOX FOR MOTOR VEHICLE PEDALS

[76] Inventor: David Jarrett, 759 Linden Blvd., Brooklyn, N.Y. 11203

[21] Appl. No.: 09/291,354

[22] Filed: Apr. 14, 1999

[51] Int. Cl.[7] ................................................ B60R 25/00
[52] U.S. Cl. .............................. 70/202; 70/172; 70/237
[58] Field of Search ................... 70/158, 163, 170–173, 70/199, 202, 211, 237, 245–248

[56] References Cited

U.S. PATENT DOCUMENTS

| | | | |
|---|---|---|---|
| 1,193,202 | 8/1916 | Swanson | 70/203 |
| 1,271,941 | 7/1918 | Reiser | 70/238 |
| 1,296,099 | 3/1919 | McDonald | 70/202 |
| 1,318,443 | 10/1919 | Gimperling | 70/200 |
| 1,343,459 | 6/1920 | Lacy | 70/199 |
| 1,388,149 | 8/1921 | Friedrich | 70/203 |
| 1,449,769 | 3/1923 | Marzel | 70/254 |
| 1,475,863 | 11/1923 | Pate | 70/199 |
| 1,489,574 | 4/1924 | Graham | 70/202 |
| 1,495,700 | 5/1924 | La Van Way | 70/199 |
| 1,527,992 | 3/1925 | Norton | 70/200 |
| 1,566,885 | 12/1925 | Laska | 70/200 |
| 1,579,395 | 4/1926 | Rohm et al. | 70/199 |
| 1,634,583 | 7/1927 | Kissinger | 70/200 |
| 1,792,990 | 2/1931 | La Van Way | 70/254 |
| 3,690,131 | 9/1972 | Davis | 70/203 |
| 4,076,095 | 2/1978 | Adamski | 180/114 |
| 4,333,326 | 6/1982 | Winters | 70/203 |
| 4,632,209 | 12/1986 | Russell | 180/287 |
| 4,876,865 | 10/1989 | Trinidad et al. | 70/203 |
| 4,993,248 | 2/1991 | Nordberg | 70/211 X |
| 5,359,868 | 11/1994 | Villani | 70/237 X |
| 5,537,846 | 7/1996 | Simon | 70/202 |
| 5,845,521 | 12/1998 | Najera | 70/237 X |
| 5,906,121 | 5/1999 | Mankarious | 70/199 |
| 5,979,197 | 11/1999 | Mellini et al. | 70/199 |

FOREIGN PATENT DOCUMENTS

| | | | |
|---|---|---|---|
| 177400 | 3/1922 | United Kingdom | 70/202 |
| 2152454 | 8/1985 | United Kingdom | 70/247 |
| 2263260 | 7/1993 | United Kingdom | 70/158 |

*Primary Examiner*—Lyoyd A. Gall
*Attorney, Agent, or Firm*—Steven Horowitz

[57] ABSTRACT

An anti-theft locking device for the accelerator pedal of a motor vehicle has rigid flat upper and lower plates, a rectangular lockbox open at both a front end and a front portion of its top and having a first pair of opposing inside ledges to receive the lower plate, and a shorter handled box that can fit into the lockbox and is open at a rear end but has a front end wall that includes an opening for the pedal arm. The handled box has a second pair of opposing inside ledges to receive the upper plate. After the plates are inserted into the lockbox and the handled box, the device is positioned around the pedal with the pedal spaced between the lower and upper plates and the pedal arm extending out of the front end of the lockbox. The handled box, perched above the lockbox in an open position, is then lowered into a closed position until the upper plate presses against the top of the pedal and the handled box is subsumed within the lockbox. The pedal is then wedged between the upper and lower plates and the front end wall blocks the pedal's escape from the device. The handled box is kept in closed position subsumed within the lockbox by a crossbar traversing the ceiling of the handled box. The open ends of the crossbar fit into apertures in opposite walls of the lockbox and the crossbar is further lockable by a simple key lock.

5 Claims, 4 Drawing Sheets

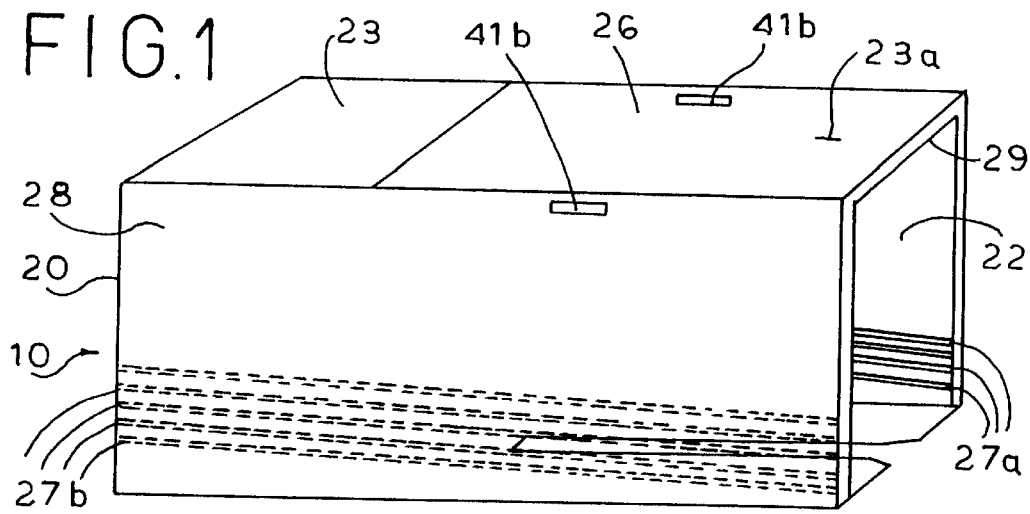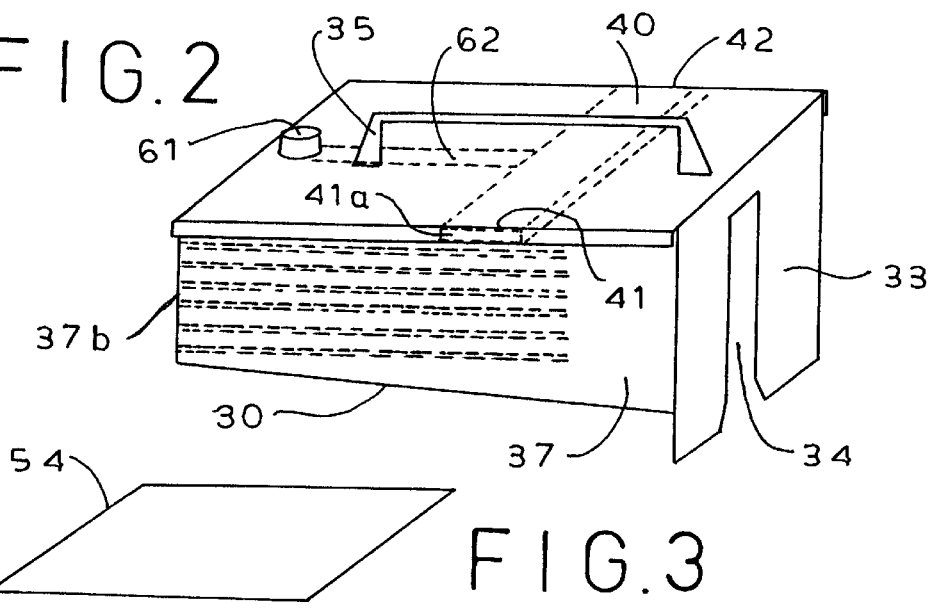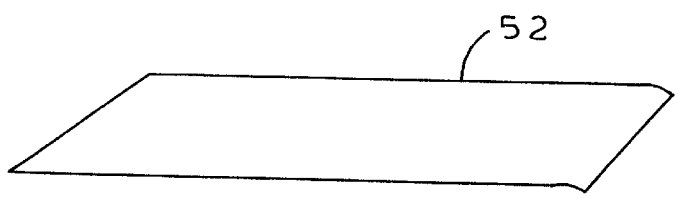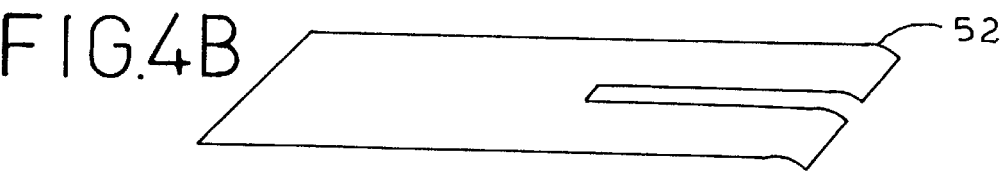

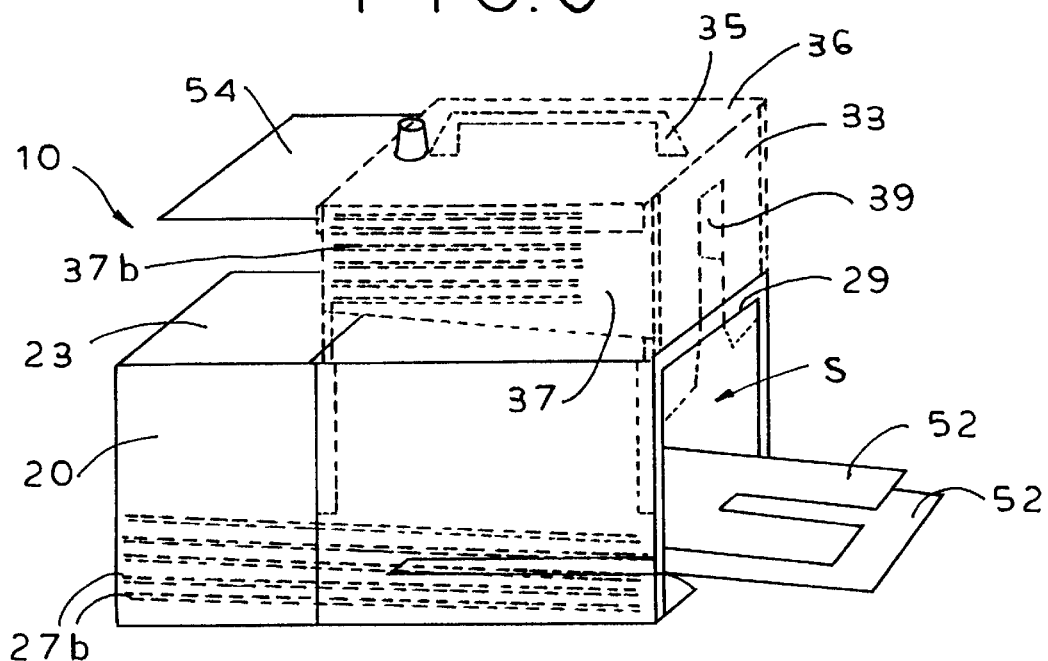
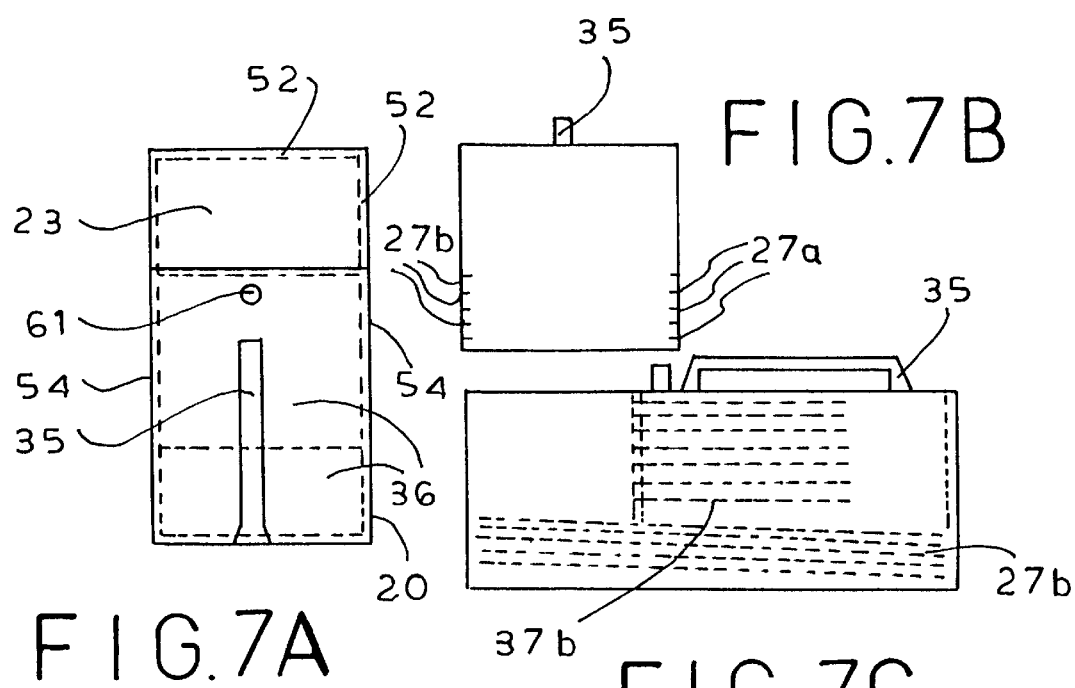

ANTI-THEFT DEVICE INCLUDING LOCKBOX FOR MOTOR VEHICLE PEDALS

BACKGROUND OF THE INVENTION AND DESCRIPTION OF THE PRIOR ART

This invention relates to anti-theft devices for automobiles and other motor vehicles that have a gas pedal and are most relevant to such anti-theft devices that immobilize and lock the accelerator pedal of the vehicle. Secondarily, the present invention relates to an anti-theft device that immobilizes the clutch pedal of a motor vehicle having a standard transmission.

Theft of motor vehicles has been well recognized for a long time as a serious problem. There has been a long felt need to prevent such theft. Many attempts have been made to eliminate or at least reduce the occurrence of such theft and they are well known. The following patents are in the area of anti-theft pedal locking devices: U.S. Pat. Nos. 4,876,865 to Trinidad et al., U.S. Pat. No. 4,632,209 to Russell, U.S. Pat. No. 4,333,326 to Winters, U.S. Pat. No. 4,076,095 to Adamski, U.S. Pat. No. 3,690,131 to Davis, U.S. Pat. Nos. 1,495,700 and 1,792,990 to W. W. La Van Way, U.S. Pat. No. 1,634,583 to Kissinger, U.S. Pat. No. 1,449,769 to Martel, U.S. Pat. No. 1,318,443 to Gimperling, U.S. Pat. No. 1,271,941 to Reiser and U.S. Pat. No. 1,193,202 to Swanson.

Although U.S. Pat. No. 4,632,209 to Russell claims to be applicable to existing automobiles through retrofitting, it requires the device to hingably attached to the floor of the automobile. This involves substantial work and is not easy to apply. The average car user will not drill a hole in the floor of his car or even have a mechanic do so. Moreover, doing so is much more complicated than slipping on a portable device around the pedal.

U.S. Pat. No. 4,333,326 to Winters is a brake and clutch lock assembly including a base and it relies on a first end of the base being in contact with the vehicular floor. It is not designed for accelerator pedals but for brakes or clutch pedals. Furthermore, even for clutch pedals, it can be gotten around by a slight rubbing away or digging out of the floor of the vehicle. Finally, it is not clear how tightly it locks or what range of vehicles it can be applied to since the height of the first and second wall elements below the apertures must correspond perfectly to the height of the pedal arm for it to work properly.

U.S. Pat. No. 1,634,583 to Kissinger is limited to the standard transmission automobiles of the type having a foot brake, a reversing gear pedal and clutch pedal in linear formation.

While there are numerous and varied ways to accomplish the locking of the accelerator or clutch pedal, it is necessary that the device be effective in locking such pedal securely, be easy to apply and remove, versatile enough to be usable on both standard and automatic transmission motor vehicles and be relatively inexpensive and be of simple construction and easy to manufacture. None of the above patents have all of these characteristics.

The present invention meets all of the above needs and is an anti-theft device that is effective in locking the pedal to block thieves, is versatile and very easy to use and is of simple construction and easy to manufacture.

SUMMARY OF THE PRESENT INVENTION

The present invention is an anti-theft locking device for the floor pedal of a motor vehicle, particularly the accelerator pedal and sometimes the clutch pedal, that is basically made out of two simple boxes and two simple flat plates. As described more fully below, the device has what has been designated as an upper and lower plate, a rectangular lockbox and a rectangular or cubical handled box shorter than the lockbox. After the plates are inserted into the lockbox and the handled box, the device is simply positioned around the pedal with the pedal spaced between the lower and upper plates and the pedal arm extending out of the front end of the lockbox. The handled box, which is perched above the lockbox in an open position, is then pushed down into a closed position inside the lockbox until the upper plate presses against the top of the pedal and the handled box is completely subsumed inside the lockbox. As a result, the pedal is wedged between the upper and lower plates and the front end wall blocks the pedal's escape from the device. The handled box is kept in closed position subsumed within the lockbox by a simple crossbar traversing the ceiling of the handled box. The open ends of the crossbar fit into apertures carved out of opposite walls of the lockbox and the crossbar may be further lockable by a simple key lock.

OBJECTS AND ADVANTAGES

The following important objects and advantages of the present invention are:

(1) to provide a device that can prevent the theft of motor vehicles by locking and rendering inoperative the pedal, such as the accelerator pedal, near the floor of the vehicle, (2) to provide an anti-theft device that locks and immobilizes the accelerator pedal in such a way that it is easy to use and therefore likely to be used, (3) to provide an anti-theft device that is simple to construct and easy to manufacture, (4) to provide an anti-theft accelerator pedal locking device that is not overly heavy or bulky and therefore is relatively easy for the user to maneuver in terms of applying to the pedal and unlocking and removing from the pedal, (5) to provide an anti-theft device that is comprised of a lockbox open on both ends that can receive a rigid flat upper plate and a handled box mostly closed on its front end that can receive a flat lower plate whereby the handled box in open position is perched above the lockbox and can be lowered into the lockbox and held in place securely, (6) to provide an anti-theft device whereby in open position it can be placed around the pedal and then the handled box can be pushed down into the lockbox so that the pedal is wedged between the upper and lower plates, (7) to provide an anti-theft device whereby the handled box forming a part thereof can be held securely in closed position by a crossbar traversing the width of the device fits into apertures in opposite side walls of the lockbox and can be further locked by a projection controlled by a simple key lock, (8) to provide an anti-theft device whereby the pedal can be locked in place by covering it with a simple rectangular lockbox having a handled box that can be pushed into it, (9) to provide an anti-theft device that is versatile enough that it is usable on both automatic transmission and standard transmission motor vehicles and that can be used on any acceleration pedal of a motor vehicle.

BRIEF DESCRIPTION OF THE DRAWINGS

FIG. 1 is a perspective view of the lockbox of the present invention.

FIG. 2 is a perspective view of the handled box of the present invention.

FIG. 3 is a perspective view of the upper plate of the present invention.

FIG. 4A is a perspective view of the preferred embodiment of the lower plate of the present invention.

FIG. 4B is a perspective view of an alternative embodiment of the lower plate of the present invention.

FIG. 6 is a perspective view of the device of the present invention in open position and showing the plates being inserted.

FIG. 7A is a top view of the device of the present invention in closed position.

FIG. 7B is a front view of the device of the present invention in closed position.

FIG. 7C is a side view of the device of the present invention in closed position.

DETAILED DESCRIPTION OF THE DRAWINGS

Figure 5A:
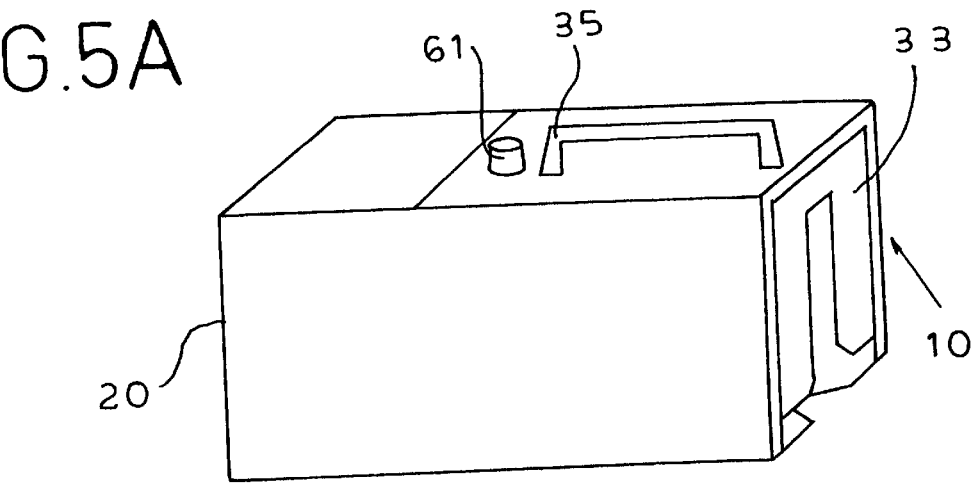
FIG. 5A is a perspective view of the device of the present invention in closed position.
Figure 5B:
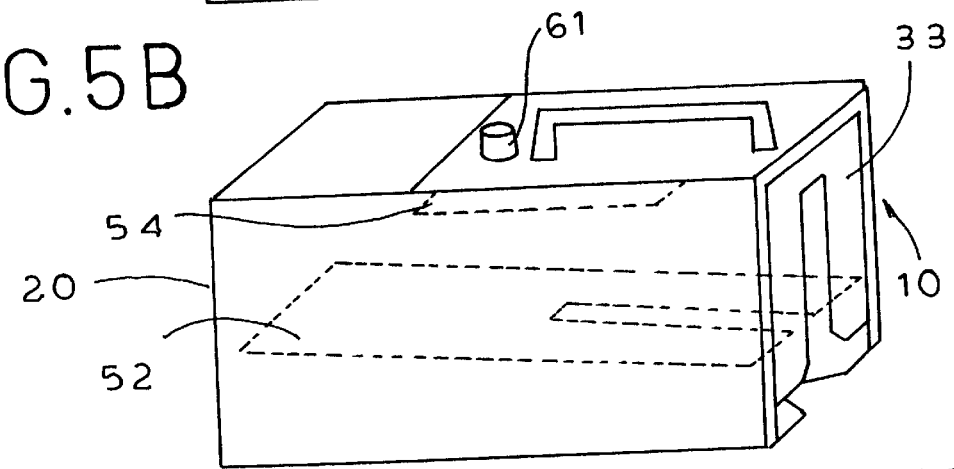
FIG. 5B is a perspective view of the device of the present invention in closed position showing the upper plate and the alternative embodiment of the lower plate in dashed lines.
Figure 5C:
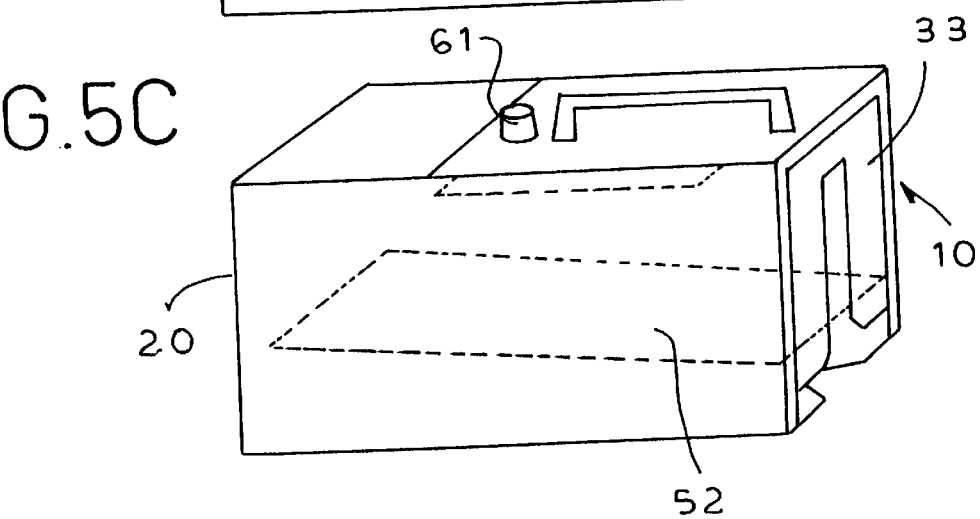
FIG. 5C is a perspective view of the device of the present invention in closed position showing the upper plate and the preferred embodiment of the lower plate in dashed lines.

The invention will now be illustrated by reference to the accompanying drawings. The device 10 of the present invention can be used in a motor vehicle having a pedal, such as an accelerator, proximate to a floor of the vehicle and it is usually the case that the pedal controls the operation of the vehicle and therefore controlling the pedal prevents theft of the vehicle. The present invention is designed specifically to apply to the accelerator pedal and not the brake pedal of a motor vehicle, although the present invention can also be applied to the clutch pedal of a motor vehicle. Accordingly, the term "pedal" as used below refers to this kind of pedal. The pedal of the motor vehicle typically connects to a pedal arm that extends from the pedal usually into a front area of the vehicle. The device 10 of the present invention is essentially composed of two simple boxes, one that springably fits into the other, and two simple flat plates that slide into ledges inside the boxes.

In particular, as seen from FIGS. 1–8, device 10 is an anti-theft device for locking the pedal 12. Device 10 includes a rigid flat lower plate 52 (see FIGS. 4A, 4B), a rigid flat upper plate 54 (see FIG. 3), and a rectangular lockbox 20 (see FIG. 1) open at both a front end 22 and a front portion 23a of the top 23 of lockbox 20. Lockbox 20 has a first pair of opposing inside ledges 27a, 27b running through most of the length of the lockbox 20 to receive the lower plate 52.

As best seen in FIGS. 2 and 6, device 10 also includes a rectangular or cubical handled box 30 shorter and slightly narrower than the lockbox 20 which is open at a rear end but has a front end wall 33 that includes an opening 34 for the pedal arm 13 of pedal 12. The handled box 30 has a second pair of opposing inside ledges 37a (not shown), 37b running through more than half the length of the handled box 30 to receive the upper plate 54.

When the handled box 30 is in the open position (see FIG. 6), device 10 is capable of being positioned around the pedal 12 so that pedal 12 is spaced between the lower plate 52 and the upper plate 54 and the pedal arm 13 extends out of the front end 22 of lockbox 20. In open position, handled box 30 rests on a spring (see FIG. 6) in the lockbox 20 that keeps the handled box 30 perched above the lockbox 20. In particular, handled box 30 is perched directly above the front portion 23a of the top 23 of the lockbox 20.

Figure 8:
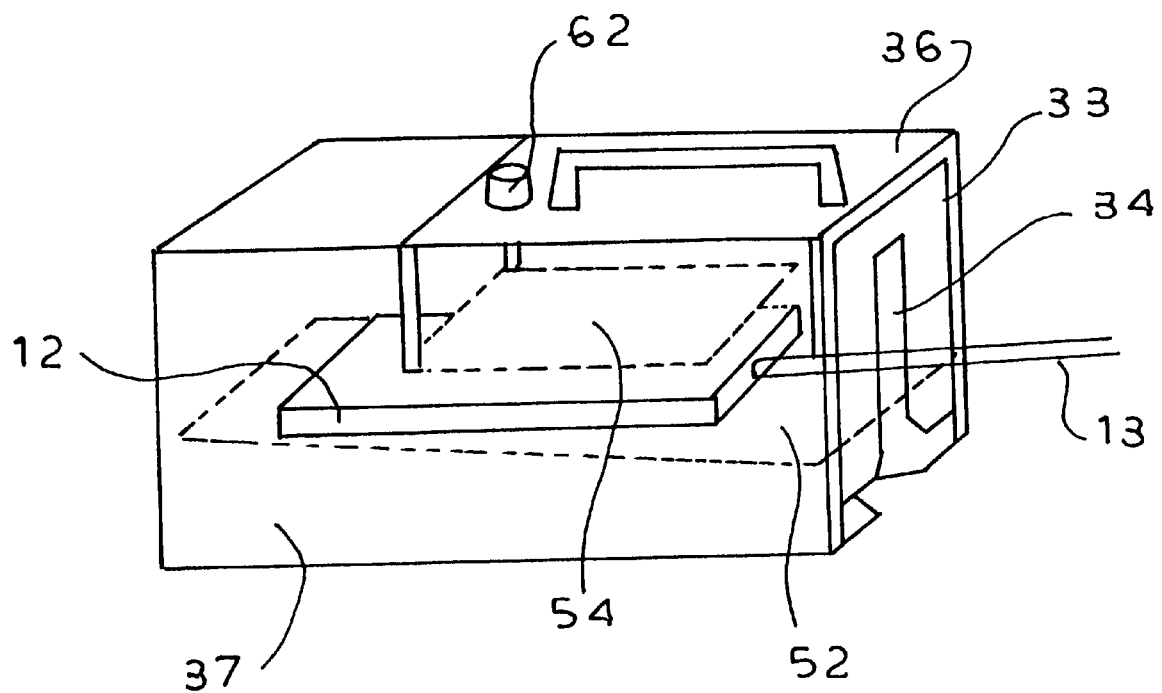
FIG. 8 is a perspective view of the device of the present invention in closed position showing the pedal wedged between the plates.

As seen in FIG. 8, by gripping and depressing handle 35, handled box 30 can be lowered into a closed position against the force of the spring so that the handled box 30 is subsumed within lockbox 20, so that the pedal 12 is wedged between the upper plate 54 and lower plate 52 and so that the front end wall 33 of the handled box 30 blocks the pedal's 12 escape from the device 10. In closed position, upper plate 54 presses strongly against the top of pedal 12 and the bottom of pedal 12 is pushing hard against the top of lower plate 52. In closed position, the apertures 41a in the opposite side walls 37, 39 of the handled box 30 (see FIG. 2 for one of these apertures) will be lined up adjacent to corresponding apertures 41b in the side walls 26, 28 of the lockbox 20.

As best seen in FIG. 2, the handled box 30 is also secured in closed position within the lockbox 20 by a crossbar 40 that traverses the width of the lockbox 20 near a ceiling 36 of the handled box 30. Crossbar 40 has two free ends 41, 42 that extend into apertures 41a on opposite side walls 37, 39 of the handled box 30 and through apertures 41b in opposite side walls 26, 28 of the lockbox 20. The crossbar 40 is further secured in place by a horizontally rotatable projection 62 controlled by a key-operated lock 61.

As best seen in FIGS. 5–8, when the handled box 30 is closed and subsumed within the lockbox 20, the front end wall 33 of the handled box 30 is substantially flush with the open front end 22 of the lockbox 20. This is because the length of handled box 30 is generally roughly equal to the length of that portion of lockbox 20 that has an exposed top, namely open front portion 23a of the top 23 of lockbox 20. Note that handled box 30 is shorter at least by the thickness of horizontal front bar 29 of lockbox 20 and may optionally be shorter still.

In operation, lower plate 52 is first inserted into lockbox 20 by sliding lower plate 52 along the inside ledges 27a, 27b running the length of the lockbox 20. Ledges 27a, 27b run parallel on opposite sides of lockbox 20 and run almost the entire length of lockbox 20. There may be more than one pair of such inside ledges in lockbox 20 at various heights of the lockbox 20. Ledges 27a, 27b are depicted in drawings by dashed lines when they are inside and not visible.

The next step is to insert upper plate 54 into handled box 30 by sliding it along the inside ledges 37a, 37b of handled box 30. Ledges 37a, 37b run more than half the length of handled box 30. Ledges 37a, 37b are depicted in drawings by dashed lines when they are inside and not visible.

After the lower plate 52 and upper plate 54 have been inserted, device 10 is positioned around the pedal 12 with the front end 22 of lockbox 20 facing pedal arm 13. As seen in FIG. 8, after the handled box 30 is pushed into closed position inside the lockbox 20, front end wall 33 of handled box 30 permits pedal arm 13 to traverse front end wall 33 through opening 34. While pedal 12 is already wedged securely between lower plate 52 and upper plate 54, front end wall 33 thus provides further assistance in blocking the pedal's escape from the device.

Due to the fact that the elements of the device 10 are essentially two boxes and two flat plates having ledges and a spring and crossbar with an extremely simple key lock, the device 10 is of simple construction, very easy to manufacture and easy to maneuver, unlike many of the prior art pedal locking devices.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. In a motor vehicle having at least an accelerator pedal proximate to a floor of the vehicle, which pedal controls the operation of the vehicle, and a pedal arm extending from said pedal, an anti-theft device for locking the pedal of simple construction, comprising:

a rigid flat lower plate and a rigid flat upper plate, a rectangular lockbox open at both a front end and a front portion of a top of the lockbox and having a first pair of opposing inside ledges running through most of the length of the lockbox to receive the lower plate, a handled box shorter and slightly narrower than the lockbox which is open at a rear end but has a front end wall that includes an opening for the pedal arm, said handled box having a second pair of opposing inside ledges running through more than half the length of the handled box to receive the upper plate, the device being capable, when the handled box is in the open position, of being positioned around the pedal with the pedal spaced between the lower and upper plates and the pedal arm extending out of the front end of the lockbox, the handled box resting on a spring in the lockbox that keeps the handled box perched above the lockbox when the device is in an open position, the handled box lowerable into a closed position against the force of the spring so that the handled box is subsumed within the lockbox, so that the pedal is wedged between the upper and lower plates and so that the front end wall of the handled box blocks the pedal's escape from the device.

2. The device of claim 1, wherein the handled box is secured in closed position within the lockbox by a crossbar that traverses a width of the lockbox near a ceiling of the handled box, which crossbar has free ends that extend into apertures in opposite walls of the lockbox, said crossbar being further held in place by a horizontally rotatable projection controlled by a key.

3. The device of claim 1, wherein when the handled box is closed and subsumed within the lockbox the front end wall of the handled box is substantially flush with the front end of the lockbox.

4. The device of claim 1, wherein the handled box is subsumed in closed position snugly within the lockbox.

5. The device of claim 1, wherein the handled box is secured in closed position within the lockbox by a crossbar that traverses a width of the lockbox near a ceiling of the handled box, which crossbar has free ends that extend into apertures in opposite walls of the lockbox, said crossbar being further held in place by a horizontally rotatable projection controlled by a key, and wherein when the handled box is closed and subsumed within the lockbox the front end wall of the handled box substantially flush with the front end of the lockbox.

* * * * *